(12) United States Patent
Baldwin

(10) Patent No.: US 6,472,636 B1
(45) Date of Patent: Oct. 29, 2002

(54) BUS BAR ARRANGEMENT FOR HEATABLE VEHICLE WINDOW

(75) Inventor: Craig A. Baldwin, Pleasant Ridge, MI (US)

(73) Assignee: Guardian Industries Corp., Auburn Hills, MI (US)

( * ) Notice: Subject to any disclaimer, the term of this patent is extended or adjusted under 35 U.S.C. 154(b) by 0 days.

(21) Appl. No.: 09/816,667

(22) Filed: Mar. 26, 2001

(51) Int. Cl.[7] .................................................. B60L 1/02
(52) U.S. Cl. ........................................ 219/203; 428/336
(58) Field of Search .................................. 219/203, 541, 219/547, 543; 392/439; 343/713; 428/336, 46; 29/611; 156/100

(56) References Cited

U.S. PATENT DOCUMENTS

| | | | |
|---|---|---|---|
| 4,100,398 A | * 7/1978 | Levin ........................ 219/541 |
| 4,786,784 A | * 11/1988 | Nikodem et al. ........... 219/543 |
| 4,815,198 A | * 3/1989 | Ramus ........................ 29/611 |
| 4,918,288 A | * 4/1990 | Carter et al. ................ 219/203 |
| 5,119,467 A | * 6/1992 | Barsky et al. ............... 392/439 |
| 5,128,513 A | * 7/1992 | Bayars et al. ............... 219/203 |
| 5,208,444 A | * 5/1993 | Winter et al. ............... 219/547 |
| 5,213,828 A | * 5/1993 | Winter et al. ................ 428/46 |
| 5,229,205 A | * 7/1993 | Nietering .................... 428/336 |
| 5,348,599 A | * 9/1994 | Nietering .................... 156/100 |
| 5,543,601 A | * 8/1996 | Bartrug et al. .............. 219/203 |
| 5,748,155 A | * 5/1998 | Kadunce et al. ............ 343/713 |
| 6,204,480 B1 | * 3/2001 | Woodard .................... 219/203 |
| 2002/0015824 A1 | 2/2002 | Kawamoto et al. | |

* cited by examiner

Primary Examiner—Teresa Walberg
Assistant Examiner—Leonid M Fastovsky
(74) Attorney, Agent, or Firm—Nixon & Vanderhye P.C.

(57) ABSTRACT

A bus bar arrangement for a heatable vehicle window. A conductive extension is attached to a central portion of a top bus bar and extends down one side/edge of the window to the bottom side/edge thereof so that both the top and bottom bus bar electrical connectors can be located along the same side/edge (i.e., bottom side/edge) of the window. By attaching the conductive extension to the top bus bar proximate a central portion thereof, current along or through the top bus bar may be distributed in an approximately uniform manner so as to reduce the potential for hot-spots or the like.

17 Claims, 6 Drawing Sheets

BUS BAR ARRANGEMENT FOR HEATABLE VEHICLE WINDOW

This invention relates to a bus bar arrangement for a heatable vehicle window (e.g., vehicle windshield). In particular, this invention relates to a bus bar arrangement where first and second bus bars are provided proximate opposite edges of a vehicle window, with a conductor extending from the first bus bar and leading to the opposite edge of the window so that electrical connectors for both bus bars can be provided at the same area and on the same edge of the window.

BACKGROUND OF THE INVENTION

Heatable windows are known in the art. For example, see U.S. Pat. Nos. 4,668,270; 5,434,384; 4,782,216; and 4,820,902, the disclosures of which are all hereby incorporated herein by reference. See also WO 88/06095. Heatable windows conventionally include first and second conductive bus bars in electrical contact with a transparent conductive coating including an electroconductive layer. The electroconductive layer generates heat when electric current is passed therethrough. In such a manner, snow and ice may be melted from vehicle windows such as windshields, backlites, sidelites, and/or the like. Windows may also be defogged in such a manner.

In conventional heatable windows, first and second bus bars are typically located in spaced apart relation proximate opposite edges of the window. For example, see U.S. Pat. No. 4,668,270, incorporated herein by reference. This type of design often requires the electrical connector for the top bus bar to exit the window at the top edge thereof, and the electrical connector for the bottom bus bar to exit the window at the bottom edge thereof. Unfortunately, this is undesirable in that it is much more convenient if both connectors (i.e., for both bus bars) are located along the same edge/side of the window.

In an attempt to overcome the aforesaid problem, U. S. Pat. No. 4,820,902 discloses first and second conductive leads/extensions arranged from opposite sides of the top bus bar heading down the respective sides of the windshield and across the bottom side/edge of the same. In such a manner it is possible to locate the electrical connectors for both bus bars at the bottom edge/side of the windshield. Unfortunately, the design of the '902 patent is undesirable in that it requires two separate extensions leading down both side edges of the windshield.

In a similar manner, U.S. Pat. No. 4,940,884 also requires two leads/extensions arranged from the top bus bar down to the windshield's bottom edge. Sometimes, this double lead/extension requirement is not desirable.

It will be apparent to those skilled in the art that there exists a need for a more efficient bus bar arrangement for a vehicle windshield.

SUMMARY OF THE INVENTION

An object of this invention is to provide an efficient bus bar arrangement for a heatable vehicle window (e.g., windshield).

Another object of this invention is to provide a bus bar arrangement for a heatable vehicle window, wherein a single extension is connected to a central portion of a top bus bar and extends down one side/edge of the window to the bottom side/edge thereof so that both the top and bottom bus bar electrical connectors can be located along the same side/edge (i.e., bottom side/edge) of the window.

Another object of this invention is to fulfill one or more of the above-listed objects.

Generally speaking, an example embodiment of this invention fulfills one or more of the above-listed objects by providing a heatable vehicle windshield including a top edge, a bottom edge, and first and second side edges, the heatable vehicle windshield comprising:

first and second glass substrates laminated to one another with a polymer inclusive layer therebetween;

a coating located between said first and second substrates, said coating including at least one conductive layer;

first and second conductive bus bars in electrical communication with at least said conductive layer of said coating, so that when electric current is passed through said conductive layer via said bus bars at least a portion of the windshield is heated;

wherein said first bus bar is located in a top area of said windshield and said second bus bar is located in a bottom area of said windshield;

a conductive extension member in electrical contact or communication with a central portion of said first bus bar proximate a top central area of the windshield, said conductive extension member including: a top elongated portion extending along or adjacent the top edge windshield, and a side elongated portion in electrical communication with said top elongated portion and extending along or adjacent the side edge of the windshield and spaced from said coating; and wherein first and second electrical connections in electrical communication with the first and second bus bars, respectively, are each attached to the windshield proximate the bottom edge thereof, at least one of said electrical connections supplying electric current to said conductive layer via an external power source.

Other example embodiments of this invention fulfill one or more of the above-listed objects by providing a heatable vehicle window comprising:

a coating supported by a first substrate, said coating including at least one conductive layer;

first and second conductive bus bars in electrical communication with at least said conductive layer of said coating, so that when electric current is passed through said conductive layer via said bus bars at least a portion of the window is heated;

wherein said first bus bar is at least partially located adjacent or along a first edge of the window, and said second bus bar is at least partially located adjacent or along a second edge of the window, said first and second edges of the window being opposite one another so that a primary viewing area of said window is positioned between said first and second bus bars;

a conductive extension member in electrical contact or communication with a central portion of said first bus bar proximate the first edge of the window, said conductive extension member extending along or adjacent said first edge of the window, and extending along a third edge of the window toward the second edge of the window so that first and second electrical connectors in electrical communication with the first and second bus bars, respectively, are each attached to the window proximate said second edge thereof; and wherein said first electrical connector is in electrical communication with said first bus bar via said conductive extension member, and at least one of said electrical connectors supplies electric current to said conductive layer via an external power source.

This invention will now be described with respect to certain example embodiments thereof as illustrated in the following drawings, wherein:

IN THE DRAWINGS

DETAILED DESCRIPTION OF CERTAIN EXEMPLARY EMBODIMENTS OF THE INVENTION

Figure 1:
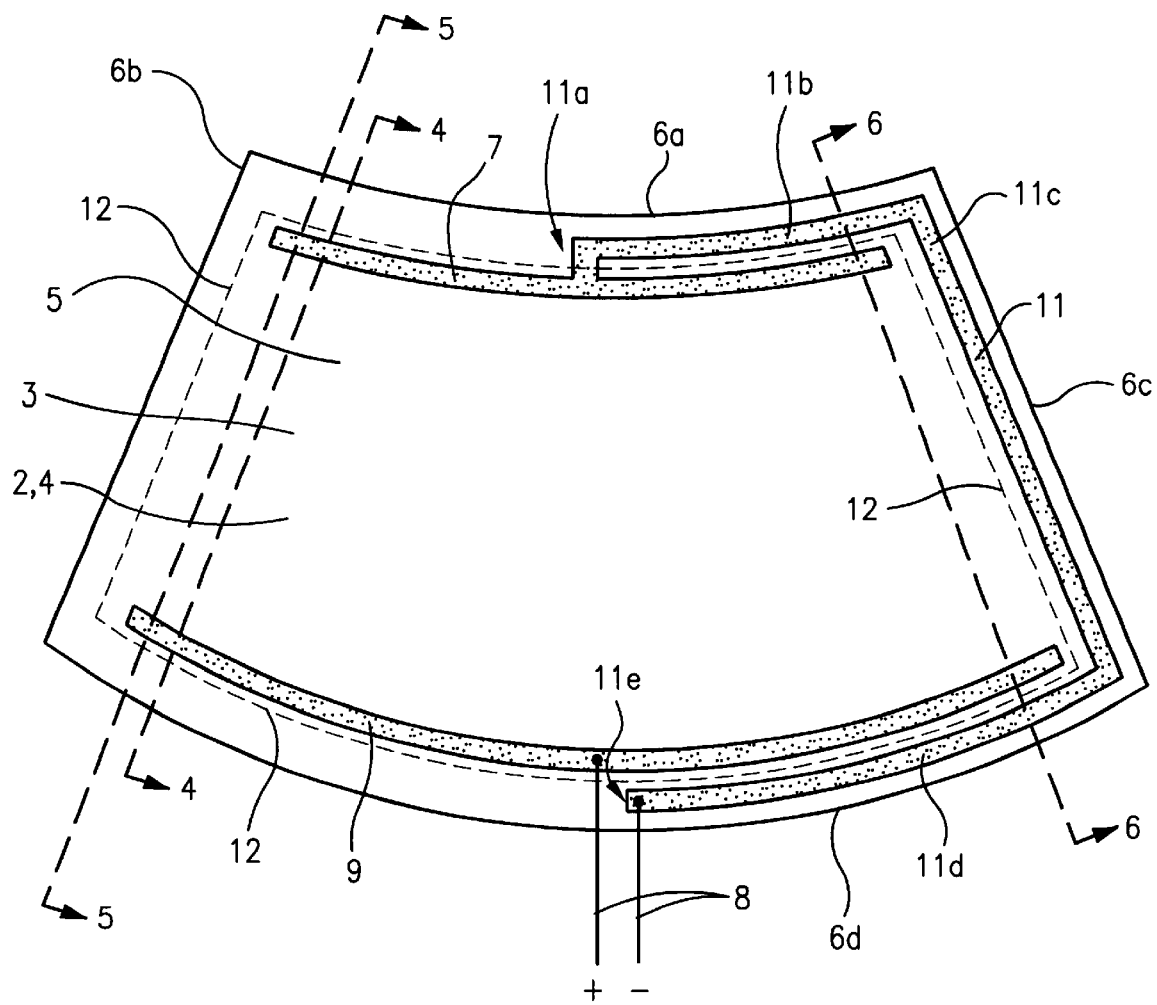
FIG. 1 is a top plan view of a heatable vehicle windshield according to an exemplary embodiment of this invention (absent opaque shielding layers for purposes of illustration simplicity).

Referring now more particularly to the accompanying drawings in which like reference numerals indicate like parts or layers throughout the several views.

Certain embodiments of this invention relate to a bus bar arrangement for a heatable vehicle window (e.g., windshield). Elongated top and bottom bus bars are provided, each of which is in electrical contact or communication with at least one electroconductive layer(s) of a coating (e.g., low-E coating) deposited on the windshield. One of the bus bars (e.g., the top bus bar) has a conductive extension extending from a central portion thereof. The extension winds from the top side/edge of the windshield down along a side edge thereof to the bottom side/edge of the windshield. In such a manner, electrical connections or connectors for both the top and bottom bus bars may be provided along the same side/edge (e.g., along or adjacent the bottom edge) of the windshield. Moreover, by attaching the conductive extension to the top bus bar proximate a central portion thereof, current along or through the top bus bar may be distributed in an approximately uniform manner to reduce the potential for hot-spots or the like.

FIG. 1 illustrates an example embodiment of this invention (opaque shielding layers are omitted from FIG. 1 for purposes of illustration simplicity). Referring to FIGS. 1, 4, 5, and 6, the vehicle windshield includes a multi-layer low-E coating 3 sandwiched between first and second glass substrates 2 and 4, respectively. A polyvinyl butyral (PVB) interlayer 5 is provided between the substrates for conventional lamination purposes. According to certain embodiments of this invention, the multi-layer coating 3 is provided on the interior surface of one of substrates 2, 4, so that the coating is provided on what is known conventionally as the windshield's #2 or #3 surface. First and second electroconductive elongated bus bars 7 and 9, respectively, are provided between the substrates 2, 4, so as to be in electrical contact with at least one electroconductive layer of the multi-layer coating 3. When current is passed through the electroconductive layer(s) of the coating 3 via bus bars 7 and 9 (using electrical connectors/leads 8), heat is generated in order to defog, defrost, and/or melt ice/snow from the vehicle window. Electrical connections/connectors 8 supply power to the coating 3 via bus bars from an external power source. An exemplary external power source may be a DC battery of the vehicle, and is represented by "+" and "−" in FIG. 1.

Referring in particular to FIG. 1, the windshield includes top side/edge 6a, opposing side edges 6b and 6c, and bottom side/edge 6d. Top bus bar 7 is provided at a top area of the windshield proximate top edge 6a, and bottom bus bar 9 is provided at a bottom area of the windshield proximate a wiper rest area and bottom edge 6d. Thus, top and bottom bus bars 7 and 9, respectively, are provided at opposite sides/edges of the windshield. Conductive extension 11 (preferably deposited at the same time, and using the same material, as bus bar 7) extends from a upper central portion of top bus bar 7 and ultimately down to a bottom side/edge of the windshield so that both electrical connectors 8 can be located on one side of the windshield in approximately the same area. Portions of coating 3 proximate the edge(s) of the substrate 2 are deleted (i.e., referred to as edge deletion) so that extension 11 is electrically insulated from coating 3 and bus bars 7, 9 at locations other than connection area 11a. Edge deletion line 12 illustrates the outer edge of coating 3 in this embodiment.

As shown in FIG. 1, conductive extension 11 includes: (a) bus bar connection portion 11a which contacts the upper central portion of top bus bar 7, (b) upper/top elongated portion 11b which extends along or adjacent the top edge 6a of the windshield above coating 3, (c) side elongated portion 11c which extends down a side of the windshield adjacent side edge 6c, spaced outwardly from coating 3 so as to be insulated therefrom, (d) bottom elongated portion 11d which extends along or adjacent the bottom edge 6d of the windshield, spaced outwardly from coating 3 and bottom bus bar 9, and (e) end 11e to which electrical connector 8 may be soldered or otherwise connected.

Still referring to FIG. 1, portion 11d of extension 11 is approximately parallel to bottom bus bar 9, top bus bar 7, and/or portion 11b in certain embodiments of this invention. Side portion 11c of extension 11 is approximately parallel to edge 6c in certain embodiments of this invention. Top portion 11b of extension 11 is approximately parallel to, and spaced from, top bus bar 7 and top windshield edge 6a in certain embodiments of this invention. Side extension portion 11c is approximately perpendicular to top and bottom portions 11b and 11d in certain embodiments of this invention. Extension 11 is preferably spaced from, and thus electrically insulated from, coating 3 at all locations with the possible exception of where the extension 11 contacts top bus bar 7.

It is noted that conductive portions 11a–11e (and/or bus bars 7, 9) are said to be located "adjacent" or "along" an edge(s) of the windshield, even though they may (and are preferably) spaced inwardly from the relevant edge(s) of the windshield. Thus, when used relative to an edge of the window or windshield, the words "adjacent" and "along" as used herein mean, for example, that at least a portion of the conductive extension portion or bus bar (i.e., any of 7, 9, and/or 11a–11e) is/are within about six (6) inches of the mentioned edge of the windshield.

Figure 2:
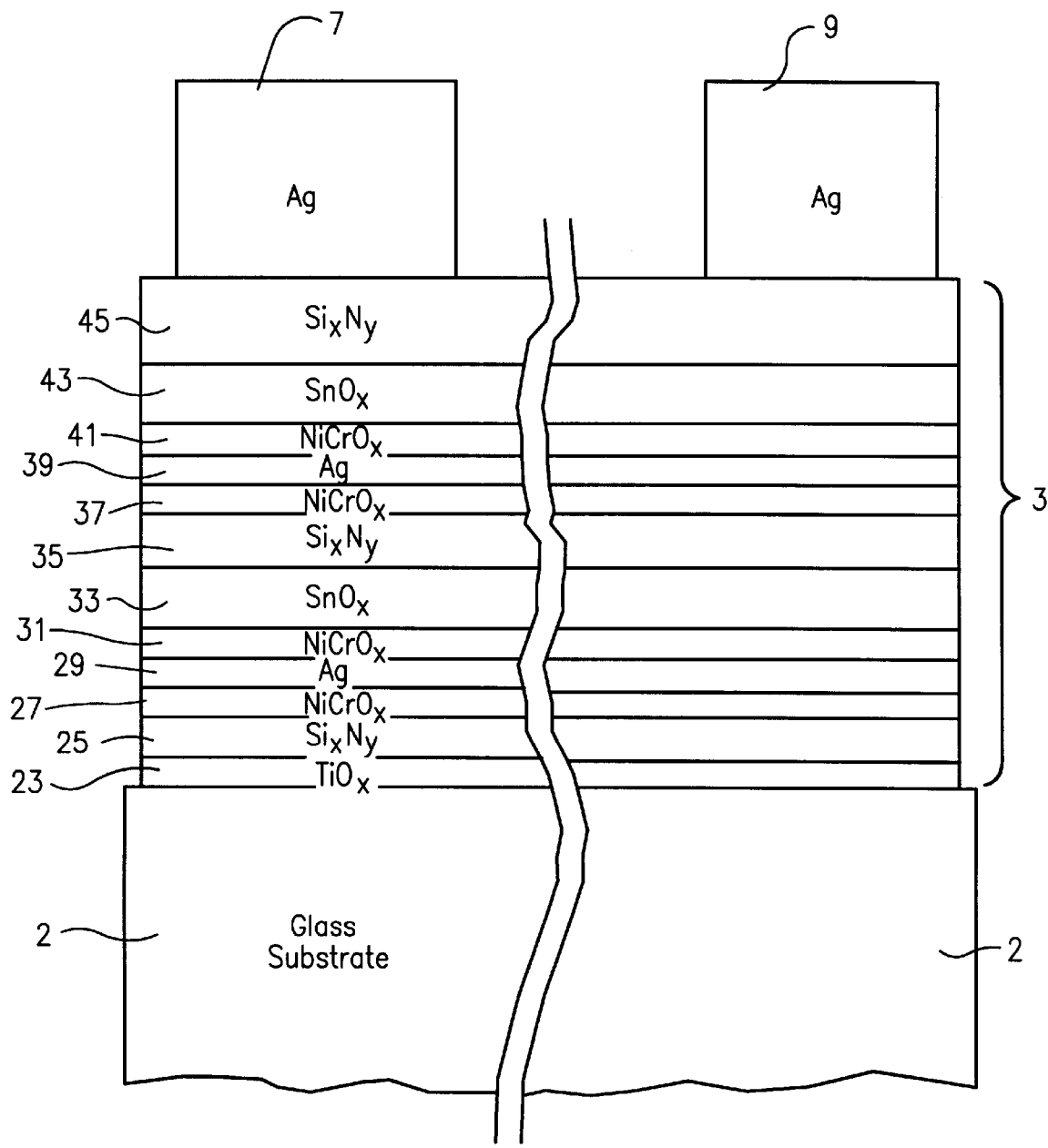
FIG. 2 is a side cross sectional view of a multi-layer coating provided on one of the substrates of the vehicle windshield of FIG. 1, with a pair of silver (Ag) frit inclusive bus bars deposited on the substrate over the coating, during the process of manufacturing the windshield of FIG. 1.
Figure 3:
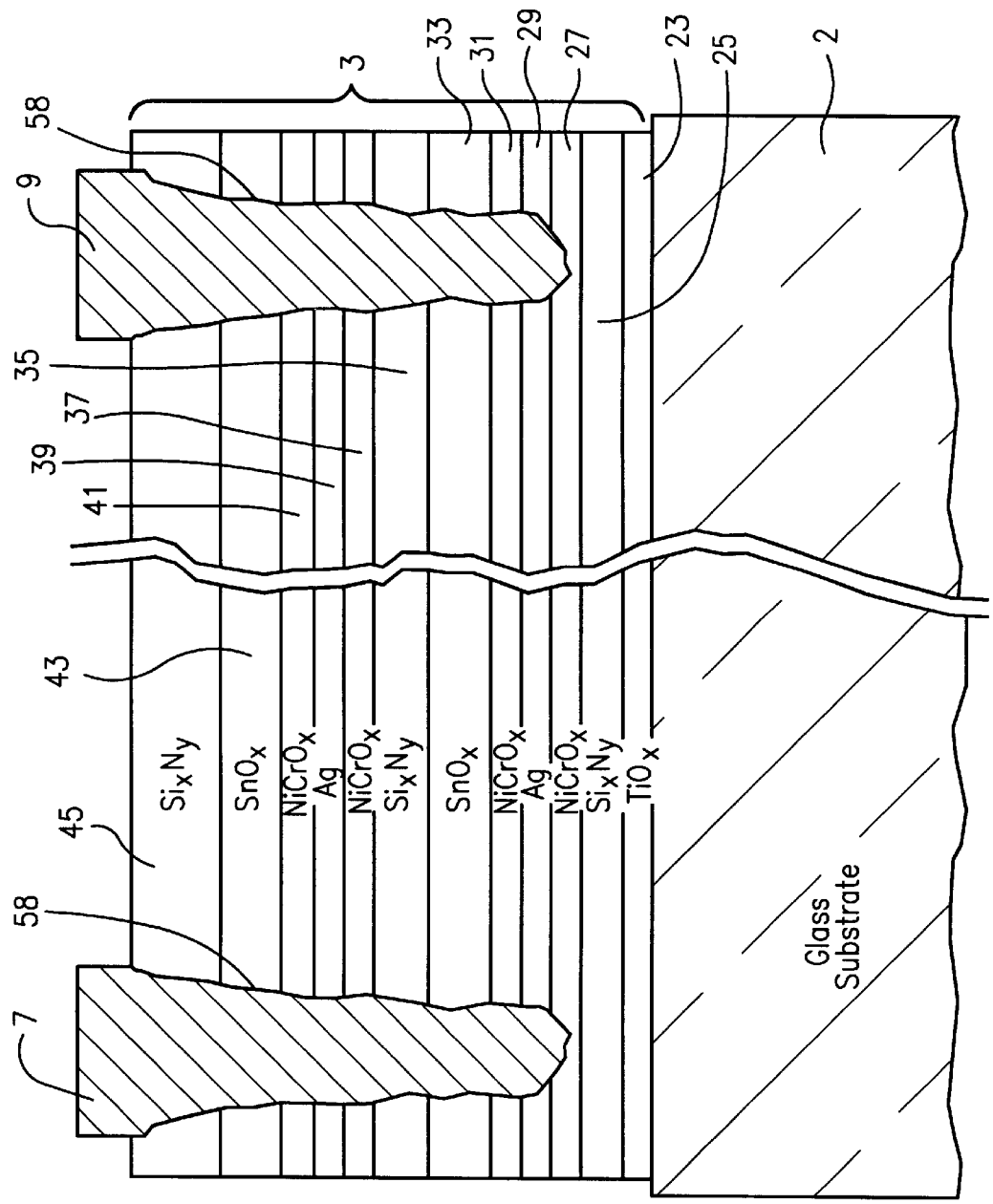
FIG. 3 is a side cross sectional view of the bus bars and coating of FIG. 2, after and/or during heating which causes at least a portion of the bus bars to bleed through at least one dielectric layer of the coating and come into contact with at least one of the electroconductive silver (Ag) layers of the coating thereby establishing an electrical connection with the same.
Figure 4:
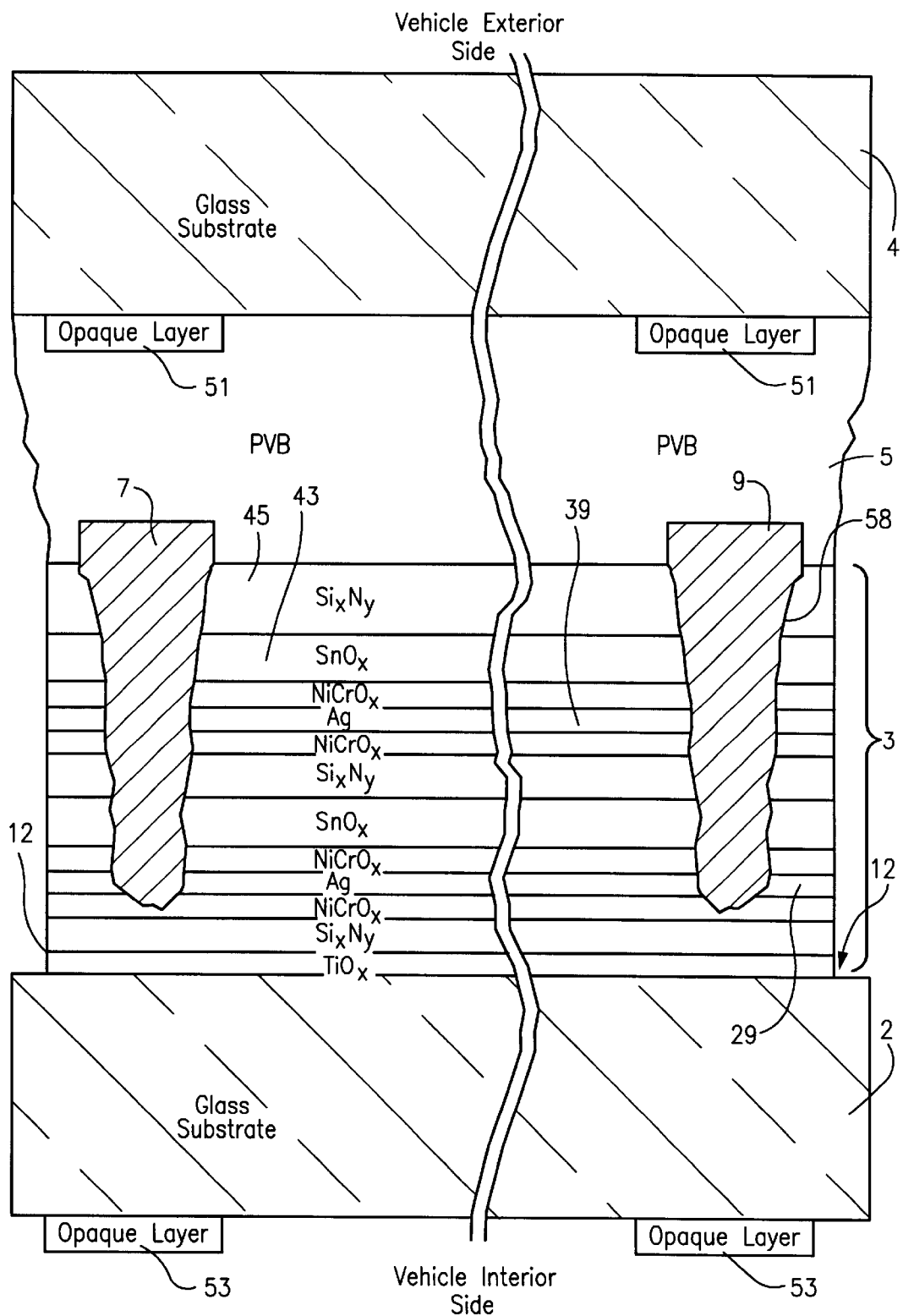
FIG. 4 is a side cross sectional view of the vehicle window of FIG. 1 (taken along Section Line 4—4 in FIG. 1), after the FIG. 3 structure has been laminated to another glass or plastic substrate with a polymer (e.g., PVB) interlayer provided therebetween to complete a vehicle windshield or other vehicle window.

Referring to FIGS. 2–4, an exemplary method of making the heatable windshield(s) of FIG. 1 will now be described. The materials illustrated for the various layers in FIGS. 2–4 are for purposes of example only. Initially, float glass (e.g., soda-lime-silica glass) substrate 2 is provided. Substrate 2 is from about 1.0 to 10.0 mm thick, more preferably from about 1.6 mm to 4 mm thick. Low-E coating 3 is deposited on substrate 2. Multi-layer coating 3 includes first dielectric anti-reflection layer 23, second dielectric haze-reducing layer 25, first lower contact layer 27 (which contacts layer 29), first electroconductive metallic infrared (IR) reflecting layer 29, first upper contact layer 31 (which contacts layer 29), third dielectric layer 33 (which may be deposited in one or multiple steps in different embodiments of this invention), fourth dielectric layer 35, second lower contact layer 37 (which contacts layer 39), second electroconductive metallic IR reflecting layer 39, second upper contact layer 41 (which contacts layer 39), fifth dielectric layer 43, and finally sixth protective dielectric layer 45. The "contact" layers each contact at least one IR reflecting layer. The aforesaid layers 23–45 make up heat treatable low-E (i.e., low emissivity) coating 3 which is provided on substrate 2.

In certain embodiments of this invention, first dielectric layer 23 may be of or include titanium dioxide ($TiO_x$ where x is from 1.7 to 2.3, most preferably 2.0), silicon nitride ($Si_xN_y$ where x/y may be about 0.75 (i.e., $Si_3N_4$), or alternatively x/y may be from about 0.76 to 1.5 in Si-rich embodiments), silicon dioxide ($SiO_x$ where x is from 1.7 to 2.3, most preferably about 2.0), niobium oxide (e.g., $Nb_2O_5$), SiZrN, tin oxide, zinc oxide, silicon oxynitride, or any other suitable dielectric material. First dielectric layer 23 functions as an antireflection layer in certain embodiments of this invention.

Second dielectric layer 25 may function to reduce haze in certain embodiments of this invention, and is preferably of or includes silicon nitride (e.g., $Si_3N_4$, or alternatively silicon-rich silicon nitride $Si_xN_y$ where x/y is from 0.76 to 1.5, more preferably from 0.85 to 1.2). When sputtering silicon nitride layer(s) herein, a Si target may be used, or alternatively a target including Si admixed with up to 3–20% by weight aluminum and/or stainless steel (e.g. SS#316) may be used, with about this amount of aluminum and/or steel then appearing in the layer(s) so formed. Other materials may also be used for haze reducing layer 25, including but not limited to SiZrN.

While $Si_3N_4$ may be used for layer 25 (and/or layer 35) in certain embodiments, it has been found that a silicon rich type of silicon nitride as layer 25 is better at reducing haze and/or improving mechanical durability in certain embodiments of this invention. Absent this layer 25 (and/or 35), haze tends to be at least 45; whereas with this layer(s) it is reduced to no greater than 0.4 as discussed herein. In Si-rich silicon nitride embodiments, layer 25 (and/or layer 35) is of or includes $Si_xN_y$ where x/y is from 0.76 to 1.5, more preferably from about 0.85 to 1.2. $Si_3N_4$ has an index of refraction "n" of about 2.04, and an extinction coefficient "k" of about 0. Si-rich silicon nitride according to certain embodiments of this invention may have an index of refraction of at least about 2.05, more preferably of at least about 2.07, and may be 2.08 (at 550 and/or 632 m) in exemplary embodiments. Also, Si-rich silicon nitride according to certain embodiments of this invention may have an extinction coefficient "k" of at least about 0.001, and more preferably of at least about 0.003. In a first monolithic example after HT of a Si-rich nitride layer 5 (and/or 15), "n" was 2.099 and "k" was 0.0034; while in a second monolithic example after HT "n" was 2.168 and "k" was 0.014. Si-rich silicon nitride, in addition to being better at reducing haze than $Si_3N_4$, has also been found to adhere better to the titanium oxide of layer 23 in example embodiments. Surprisingly, it has also been found that Si-rich silicon nitride under the $NiCrO_x$, and Ag layers provides a lower sheet resistance ($R_s$,).

Electroconductive (or simply conductive) infrared (IR) reflecting layers 29 and 39 are preferably metallic and conductive, and may be made of or include silver (Ag), gold, or any other suitable IR reflecting material. However, metallic Ag is the material of choice for the IR reflecting layers 29 and 39 in certain example embodiments of this invention. These IR reflecting layers help enable coating 3 to have low-E characteristics, as well as heatability.

Contact layers 27, 31, 37, and 41 are of or include nickel (Ni) oxide, or a nickel alloy oxide such as nickel chrome oxide ($NiCrO_x$), in preferred embodiments of this invention. $NiCrO_x$ layers 27, 31, 37, and/or 41 may be fully oxidized in certain embodiments of this invention (i.e., fully stochiometric), or may be at least about 75% oxidized in other embodiments of this invention. While $NiCrO_x$ is a preferred material for layers 27, 31, 37 and/or 41, those skilled in the art will recognize that other materials may instead be used (e.g., oxides of Ni, oxides of Ni alloys, oxides of Cr, oxides of Cr alloys, $NiCrO_xN_y$, or any other suitable material) for one or more of these layers. It is noted that contact layers 27, 31, 37 and/or 41 may or may not be continuous in different embodiments of this invention.

When layers 27, 31, 37 and/or 41 comprise $NiCrO_x$, in certain embodiments, the Ni and Cr may be provided in different amounts, such as in the form of nichrome by weight about 80–90% Ni and 10–20% Cr. An exemplary sputtering target for depositing these layers includes not only SS-316 which consists essentially of 10% Ni and 90% other ingredients, mainly Fe and Cr, but Haynes 214 alloy as well, which by weight consists essentially of (as a nominal composition) the following materials which may also show up in these layers:

| Element | Weight % |
| --- | --- |
| Ni | 75.45 |
| Fe | 4.00 |
| Cr | 16.00 |
| C | .04 |
| Al | 4.50 |
| Y | .01 |

One or more of contact layers 27, 31, 37, and/or 41 (e.g., of or including $NiCrO_x$,) is/are preferably oxidation graded in certain embodiments of this invention so that the degree of oxidation in the layer(s) changes throughout the thickness of the layer(s). For example, one or more of contact layers (27, 31, 37 and/or 41) may be graded so as to be less oxidized at the contact interface with the immediately adjacent IR reflecting layer (29 or 39) than at a portion of the contact layer(s) further or more/most distant from the immediately adjacent IR reflecting layer. It is believed that oxidation grading of one or more of contact layer(s) enables the low-E coating 3 to achieve the combination of heat treatability and high visible transmission (which was not previously achievable using $NiCrO_x$ contact layers in a dual silver low-E coating system.

Still referring to FIG. 2, third dielectric layer 33 acts as a coupling layer between the two halves of the coating 3, and is of or includes tin oxide in certain embodiments of this invention. However, other dielectric materials may instead be used for layer 33, including but not limited to silicon nitride, titanium dioxide, niobium oxide, silicon oxynitride, zinc oxide, or the like. Fourth dielectric layer 35 functions as a haze reducer in certain embodiments of this invention, and is preferably of or includes silicon nitride (e.g., $Si_3N_4$, or alternatively silicon-rich silicon nitride discussed above). However, in alternative embodiments of this invention, other materials (e.g., SizrN) may instead be used for dielectric layer 35.

Fifth dielectric layer 43 may be of or include tin oxide in certain embodiments of this invention. However, other dielectric materials may instead be used for layer 43, including but not limited to silicon nitride, titanium dioxide, niobium oxide, silicon oxynitride, zinc oxide, or the like. Protective overcoat dielectric layer 45 is provided at least for durability purposes, and may be of or include silicon nitride (e.g., $Si_3N_4$) in certain embodiments of this invention. However, other dielectric materials may instead be used for layer 45, including but not limited to titanium dioxide, silicon oxynitride, tin oxide, zinc oxide, niobium oxide, SiZrN, or the like.

Other layer(s) below or above the illustrated coating 3 may also be provided. Thus, while the layer system or coating 3 is "on" or "supported by" substrate 2 (directly or indirectly), other layer(s) may be provided therebetween. Thus, for example, coating 3 of FIG. 2 may be considered "on" and "supported by" the substrate 2 even if other layer(s) are provided between layer 23 and substrate 2. Moreover, certain layers of coating 3 may be removed in certain embodiments, while others may be added in other embodiments of this invention without departing from the overall spirit of certain embodiments of this invention.

While various thicknesses may be used for the layers of multi-layer coating 3, exemplary thicknesses and example materials for the respective layers on the glass substrate 2 are as follows:

TABLE 1

(Example Materials/Thicknesses for Coating 3)

| Layer Layer | Preferred Range (Å) | More Preferred (Å) | Example (Å) |
|---|---|---|---|
| $TiO_2$ (layer 23) | 0–400 Å | 50–250 Å | 100 Å |
| $Si_xN_y$ (layer 25) | 0–400 Å | 50–250 Å | 170 Å |
| $NiCrO_x$ (layer 27) | 5–100 Å | 10–50 Å | 18 Å |
| Ag (layer 29) | 50–250 Å | 80–120 Å | 105 Å |
| $NiCrO_2$ (layer 31) | 5–100 Å | 10–50 Å | 16 Å |
| $SnO_2$ (layer 33) | 0–800 Å | 500–850 Å | 650 Å |
| $Si_xN_y$ (layer 35) | 0–800 Å | 50–250 Å | 170 Å |
| $NiCrO_x$ (layer 37) | 5–100 Å | 10–50 Å | 18 Å |
| Ag (layer 39) | 50–250 Å | 80–120 Å | 105 Å |
| $NiCrO_2$ (layer 41) | 5–100 Å | 10–50 Å | 16 Å |
| $SnO_2$ (layer 43) | 0–500 Å | 100–300 Å | 150 Å |
| $Si_3N_4$ (layer 45) | 0–500 Å | 100–300 Å | 250 Å |

In other example embodiments, dielectric layer 23 may be removed, and/or layers 23 and 25 may be replaced with a single silicon nitride layer of either $Si_3N_4$ or of the Si-rich type of silicon nitride described above.

In certain exemplary embodiments of this invention, coating/layer systems 3 according to example embodiments have the following low-E characteristics before/after heat treatment (HT) when in monolithic form, as set forth in Table 2:

TABLE 2

Monolithic Before/After Heat Treatment (HT)

| Characteristic | General | More Preferred | Most Preferred |
|---|---|---|---|
| $R_s$ (ohms/sq.)(before HT): | <=10.0 | <=8.0 | <=5.0 |
| $R_s$ (ohms/sq.)(after HT): | <=8.0 | <=6.0 | <=4.0 |
| $E_n$ (before HT): | <=0.08 | <=0.06 | n/a |
| $E_n$ (after HT): | <=0.07 | <=0.05 | n/a |
| Haze (after HT): | <=0.40 | <=0.30 | <=0.28 |

An example low-E coating 3 was deposited as follows on substrate 2 using a Leybold Terra-G six-chamber sputter coating apparatus. Five cathodes were in each chamber, so there were a total of 30 cathode targets in the sputter coater. Cathode numbering utilizes the first digit to refer to the coater chamber, and the second digit to refer to the cathode position in that chamber. For example, cathode # 32 was the second cathode (second digit) in the third (first digit) sputter chamber. Cathode #s C13, C14, C23, C62, C31, C32, C62, C64 and C65 were Twin Mag II type cathodes; cathode # C42 was a dual C-Mag type cathode; and cathode #s C44, C51, and C53 were planar cathodes. In the sputter coater, layers 27–31 and 37–41 were sputtered onto the substrate using DC power sputtering, while the other layers were sputtered onto the substrate using a mid-frequency AC type system. Below, "*" means Al content of approximately 10%. The line speed was 2.6 meters per minute (m/min.). All gas flows (e.g., oxygen, argon, nitrogen) are presented in units of niL/minute. In the below examples, though not shown in the charts, the oxygen flow was turned off at the sides of the NiCr targets discussed above in order to oxidation grade the contact layers 31 and 41 so that they were more oxidized further from the Ag layer(s). Volts refers to cathode volts, and amps (A) refers to cathode amps. "Tr" stands for trim; and trim (Tr) console, trim (Tr) Mid, and trim (Tr) pump are all measured in mL/minute. Pressure is measured in mbar× $10^{-3}$. Trim gas refers to individually adjusted gas flows along the cathode length to make corrections regarding layer thickness uniformity. The NiCr targets were approximately 80/20 NiCr. The process is broken into three separate charts (i.e., Part #s 1–3) because so much information is presented; only the cathode and target data is provided for all three charts for ease of reference. Both silicon nitride layers 25 and 35 were Si-rich through their entire thickness(es); as can be seen by the fact that much more inert argon (Ar) gas than nitrogen gas was used in sputtering these silicon nitride layers.

TABLE 3

Coater Setup/processes for Coating 3

(Part #1)

| Cathode Flow | Target | Volts (V) | Power (kW) | Ar Flow (mL/min) | $O_2$ Flow (mL/min) | $N_2$ |
|---|---|---|---|---|---|---|
| #13 | Ti | 743 | 73 | 200 | 25 | 80 |
| #14 | Ti | 703 | 64 | 200 | 35 | 50 |
| #23 | Ti | 738 | 63.5 | 200 | 35 | 50 |
| #42 | Si* | 456 | 29.7 | 225 | 0 | 165 |
| #44 | NiCr | 370 | 4.3 | 150 | 38 | 0 |

TABLE 3-continued

Coater Setup/processes for Coating 3

| | | | | | | |
|---|---|---|---|---|---|---|
| #51 | Ag | 432 | 3.2 | 100 | 0 | 0 |
| #53 | NiCr | 386 | 4.1 | 150 | 48 | 0 |
| #62 | Sn | 431 | 18.3 | 200 | 240 | 100 |
| #31 | Sn | 477 | 24.2 | 200 | 290 | 100 |
| #32 | Sn | 428 | 24.5 | 200 | 300 | 100 |
| #42 | Si* | 453 | 30.2 | 225 | 0 | 165 |
| #44 | NiCr | 360 | 4.2 | 150 | 38 | 0 |
| #51 | Ag | 430 | 3.2 | 100 | 0 | 0 |
| #53 | NiCr | 380 | 4.1 | 150 | 48 | 0 |
| #62 | Sn | 442 | 18.4 | 200 | 240 | 100 |
| #64 | Si* | 554 | 40.6 | 200 | 0 | 200 |
| #65 | Si* | 545 | 40.3 | 250 | 0 | 200 |

(Part #2 continued from Part #1 above[cathode/target in common])

| Cathode | Target | Amps (A) | Tank Voltage (V) | Freq (kHz) | Trim Gas |
|---|---|---|---|---|---|
| #13 | Ti | 128 | 364 | 267 | $O_2$ |
| #14 | Ti | 125 | 346 | 26.7 | $O_2$ |
| #23 | Ti | 110 | 344 | 26.5 | $O_2$ |
| #42 | Si* | n/a | 230 | 26.18 | $N_2$ |
| #44 | NiCr | 11.4 | 0 | 0 | Ar |
| #51 | Ag | 7.4 | 0 | 0 | Ar |
| #53 | NiCr | 10.7 | 0 | 0 | Ar |
| #62 | Sn | 45 | 203 | 25.03 | $O_2$ |
| #31 | Sn | 61 | 224 | 25.6 | $O_2$ |
| #32 | Sn | 60 | 225 | 25.64 | $O_2$ |
| #42 | Si* | n/a | 230 | 26.18 | $N_2$ |
| #44 | NiCr | 11.6 | 0 | 0 | Ar |
| #51 | Ag | 7.4 | 0 | 0 | Ar |
| #53 | NiCr | 10.5 | 0 | 0 | Ar |
| #62 | Sn | 42 | 208 | 25.1 | $O_2$ |
| #64 | Si* | 93.5 | 264 | 26.4 | $N_2$ |
| #65 | Si* | 93.5 | 273 | 26.2 | $N_2$ |

(Part #3 continued from Parts #1–2 above[cathode/target in common])

| Cathode active | Target | Tr Console | Tr Mid | Tr Pump | Pressure | Lambda | Lambda |
|---|---|---|---|---|---|---|---|
| #13 | Ti | 7.5 | 15 | 7.5 | 2.79E$^{-03}$ | 252 | True |
| #14 | Ti | 12.5 | 25 | 12.5 | 3.03E$^{-03}$ | 252 | True |
| #23 | Ti | 7.5 | 35 | 7.5 | 4.83E$^{-03}$ | 252 | True |
| #42 | Si* | 50 | 5 | 45 | 2.18E$^{-03}$ | 0 | False |
| #44 | NiCr | 15 | 70 | 15 | 2.26E$^{-03}$ | 0 | False |
| #51 | Ag | 15 | 70 | 15 | 1.37E$^{-03}$ | 0 | False |
| #53 | NiCr | 15 | 70 | 15 | 2.16E$^{-03}$ | 0 | False |
| #62 | Sn | 15 | 70 | 15 | 2.12E$^{-03}$ | 220 | True |
| #31 | Sn | 15 | 70 | 15 | 2.97E$^{-03}$ | 220 | True |
| #32 | Sn | 15 | 70 | 15 | 3.19E$^{-03}$ | 220 | True |
| #42 | Si* | 50 | 5 | 45 | 2.52E$^{-03}$ | 0 | False |
| #44 | NiCr | 15 | 70 | 15 | 2.30E$^{-03}$ | 0 | False |
| #51 | Ag | 15 | 70 | 15 | 1.44E$^{-03}$ | 0 | False |
| #53 | NiCr | 15 | 70 | 15 | 2.38E$^{-03}$ | 0 | False |
| #62 | Sn | 15 | 70 | 15 | 2.24E$^{-03}$ | 220 | True |
| #64 | Si* | 20 | 60 | 20 | 2.88E$^{-03}$ | 0 | False |
| #65 | Si* | 20 | 60 | 20 | 3.61E$^{-03}$ | 0 | False |

After the example of coating 3 was sputtered onto substrate 2 in accordance with the above, it was tested/measured as follows in Table 4 (i.e., in a monolithic state). Heat treatment (HT) was performed by placing the coated articles into a furnace heated to about 625 degrees C for about five (5) minutes, for purposes of simulating heat bending and/or tempering.

TABLE 4

Coating 3 Properties Before/After Heat Treatment (HT) [Monolithic]

| Characteristic | Example of Coating 3 |
|---|---|
| $T_{vis}$, Ill. A, 2° (before HT): | >=70% |
| $T_{vis}$, Ill. A, 2° (after HT): | >=78% |
| $R_s$ (ohms/sq.)(before HT): | 4.43 |
| $R_s$ (ohms/sq.)(after HT): | 3.46 |
| $E_n$ (before HT): | <=0.06 |
| $E_n$ (after HT): | <=0.05 |
| Haze (after HT): | 0.15 |

Referring to FIG. 4, after coating 3 has been sputtered onto substrate 2, bus bars 7 and 9 (e.g., of or including Ag inclusive frit) are silk screen deposited/printed on substrate 2 over coating 3 so as to be in contact with the surface of coating 3. This is shown in FIG. 4. After deposition of the bus bars 7 and 9, dielectric layers 43 and 45 of coating 3 are located between the bus bars 7, 9 and the electroconductive layers 29, 39 of coating 3. Thus, the bus bars are not in electrical contact with conductive layers 29, 39 at this time. In certain embodiments of this invention, bus bars 7 and/or 9 (and extension 11) are each from about 2 to 20 μm thick, more preferably from about 5–15 μm thick, and sometimes about 10 μm thick. Accordingly, bus bars 7 and 9 are much thicker than layers of coating 3 as deposited, although the drawings do not necessarily illustrate this for purposes of simplicity. One bus bar 7 is deposited on substrate 2 and coating 3 at an upper portion of the substrate, while the other 9 is deposited on substrate 2 and coating 3 at a lower portion of the substrate as shown in FIG. 1. Edge deletion of coating 3 is performed prior to bus bar deposition and extension 11 is silk screen deposited along with the bus bars 7, 9. Because of the edge deletion of coating 3 (see edge deletion dotted line 12 in FIG. 1), extension 11 is spaced from and insulated from coating 3 along side edge 6c and bottom edge 6d (e.g., see FIG. 6).

Referring to FIGS. 2–3, the FIG. 2 structure (with bus bars 7, 9 on substrate 2 over coating 3, and extension 11 directly on substrate 2) is then heated (e.g., to a temperature of at least 400 degrees C, more preferably from about 500 to 700 degrees C) for a period of time (e.g., at least one minute, more preferably from about 3–15 minutes) so that bus bars 7 and 9 become molten or at least reach a flowable semi-molten state (i.e., the transition/transformation and/or flowable temperature of bus bars 7 and 9 is less than that of layers 29 and 39). In certain example embodiments, this heating is also used for heat bending the coated article of FIGS. 2–3 into the desired windshield shape in windshield embodiments (i.e., the bus bars 7, 9 flow into contact with the Ag layers of the coating during the heat bending process). In alternative embodiments, this heating may be different from any heat bending.

During this bus bar bleeding heating step (which may or may not be performed simultaneously with heat bending), it has surprisingly been found that at least portions of molten or semi-molten bus bars 7, 9 bleed/flow and/or migrate downward through at least dielectric layers 43 and 45 of coating 3 until coming into contact with conductive layer(s) 39 and/or 29 of coating 3 as shown in FIG. 3. The portions of bus bars 7 and 9 extending below the surface of coating 3 (i.e., below the outer surface of layer 45) may be referred to as the run-off or bleeded portion(s) of the bus bar(s). The bus bars 7, 9 and/or coating 3 may be heated to an extent such that the bus bars end up contacting only one conductive layer 39, or alternatively to an extent such that the bus bars end up contact both conductive layers 29 and 39 of coating 3 though contact holes 58 formed in coating 3 (the contact holes 58 are formed in at least layers 41, 43 and 45 by the bleeding downward of the bus bar material). The bleeding of the bus bars 7, 9 may or may not reach substrate 2 in different embodiments of this invention, depending upon how long and to what temperature the FIG. 2 structure is heated. In preferred embodiments, after this heating/bleeding step and subsequent cooling and solidifying of the bus bars 7 and 9, the newly formed bus bars 7 and 9 are now both in electrical contact with conductive layers 29 and 39 as shown in FIG. 3 while still retaining their presence at the upper surface of coating 3 so that they can be in electrical contact with connectors 8. Because conductive extension 11 is directly on substrate 2, significant bleeding of the same does not occur during this heating step.

Connectors 8 may be attached to the bus bar 9 and/or extension end 11e at this point in the process (i.e., before lamination to another substrate). However, in alternative embodiments of this invention, the connectors 8 may be soldered onto the bus bar/extension following the autoclave where the coated article of FIG. 3 is laminated to another substrate 4.

Referring to FIGS. 3–4, after formation of the FIG. 3 structure as described above, the FIG. 3 structure is laminated to another substrate (e.g., glass substrate) 4 via PVB layer 5 thereby resulting in the heatable windshield of FIG. 4. Optionally, an opaque enamel layer (e.g., black or dark enamel) 51 may be provided on the interior surface of substrate 4 adjacent only relevant edge(s) thereof as shown in FIG. 4 in order to shield bus bars 7, 9 from the view of persons viewing the heatable window from outside the vehicle. Also, in certain optional embodiments, an opaque enamel layer (e.g., black or dark enamel) 53 may be provided on the #4 surface of the windshield or window (i.e., on the outer surface of inner substrate 2) adjacent only relevant edge(s) thereof as shown in FIG. 4 in order to shield bus bars 7, 9 from the view of persons viewing the heatable window from the vehicle interior. Instead of including enamel, layer(s) 51 and/or 53 may instead be of or include an opaque organic material such as a black primer.

Following formation of the FIG. 4 heatable window structure, it may be installed into a vehicle to complete a vehicle window assembly. When electric current is run through both conductive layers 29 and 39 of coating 3 via bus bars 7, 9, heat is generated by the coating (i.e., by at least layers 29, 39). This heat may be used to defog the window, defrost the window, and/or melt snow/ice from the window or wipers therefor.

Figure 5:
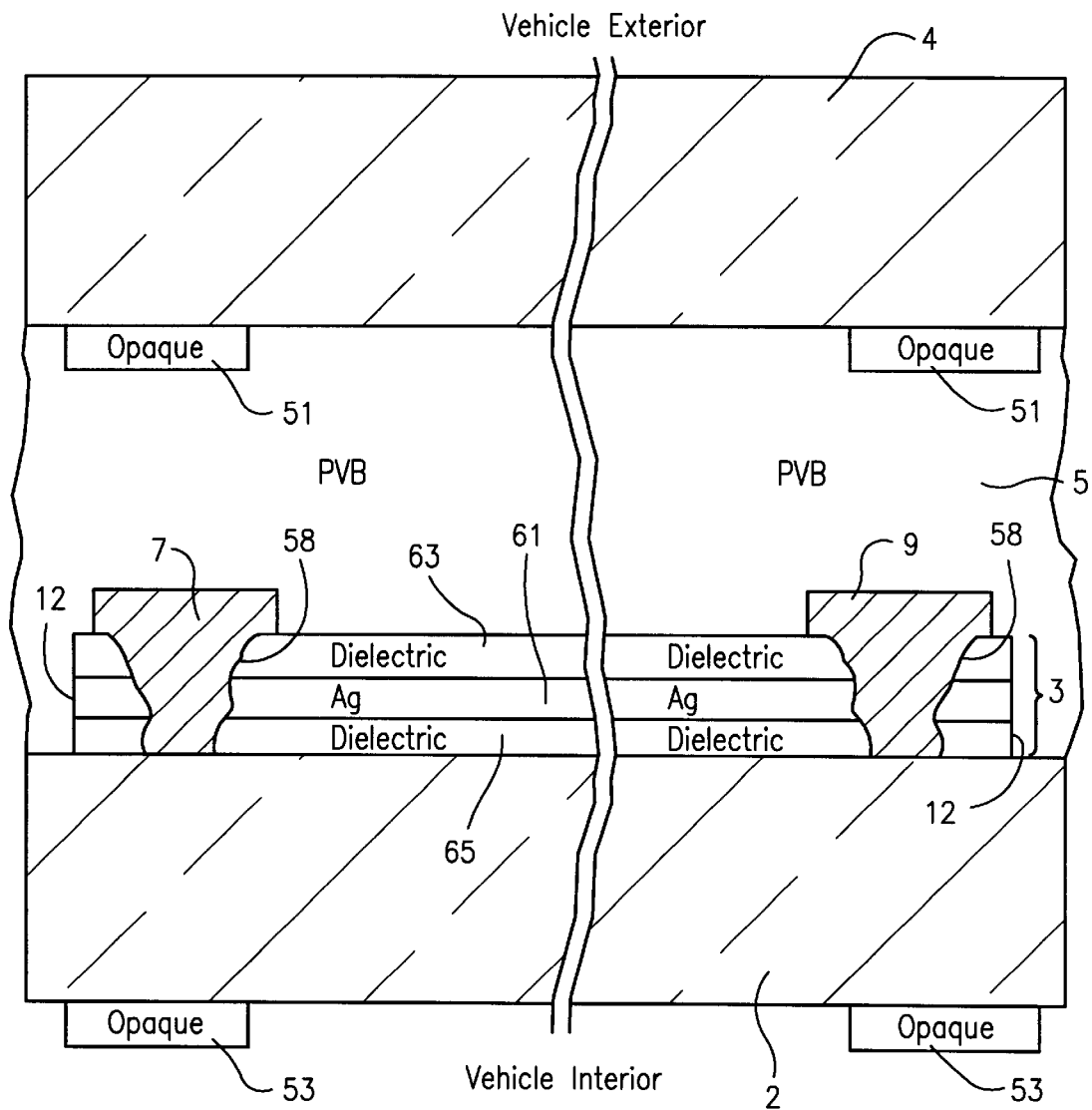
FIG. 5 is a side cross sectional view (taken along Section Line 5—5 in FIG. 1) of a vehicle window (e.g., vehicle windshield) according to another embodiment of this invention, this embodiment being the same as the FIGS. 2–4 embodiment(s) except that the multi-layer coating includes only one electroconductive layer (e.g., Ag layer) sandwiched between a pair of dielectric layers.
Figure 6:
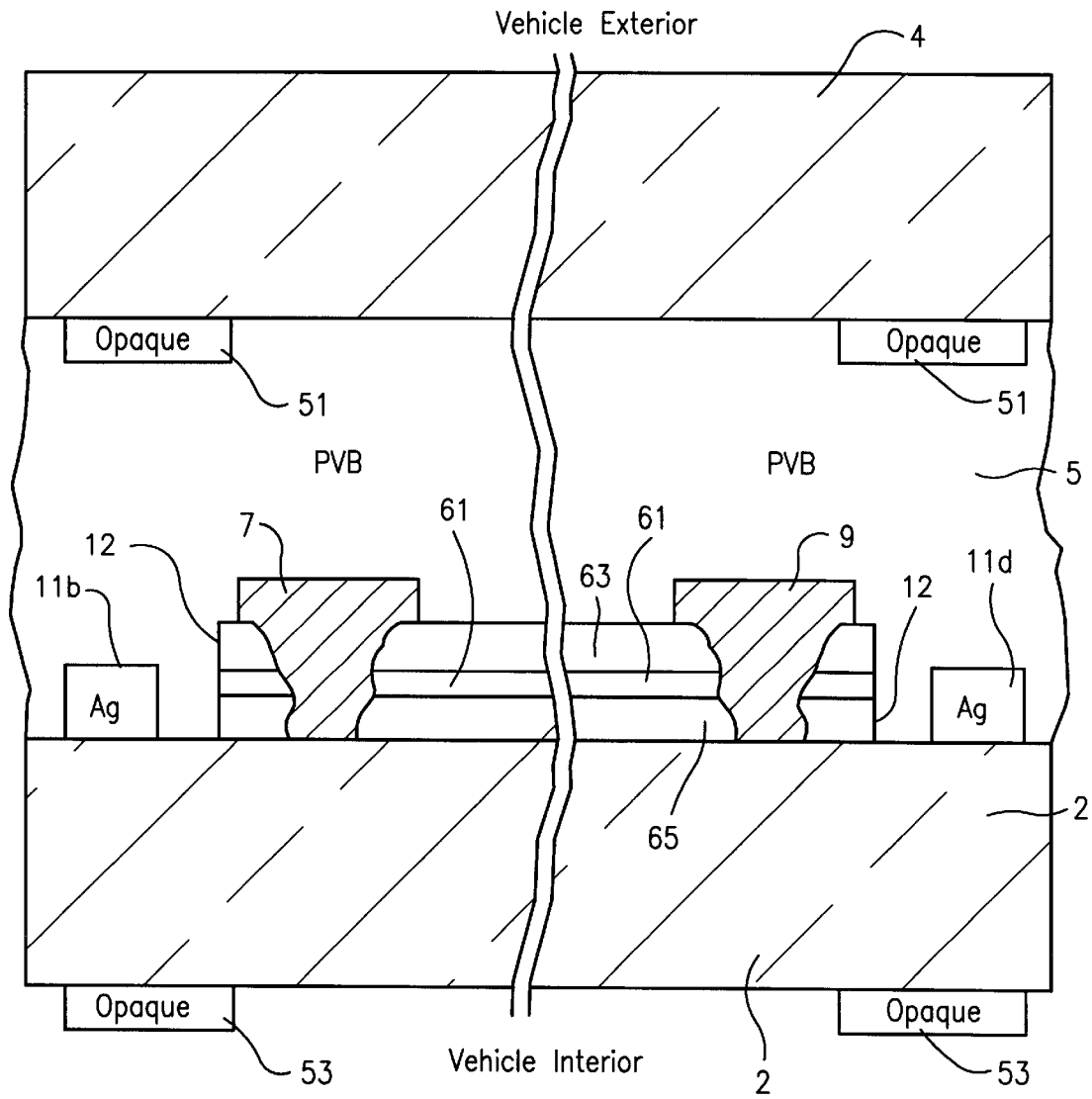
FIG. 6 is a side cross sectional view of the FIG. 5 windshield, taken along Section Line 6—6 in FIG. 1.

Referring now to FIGS. 5–6, it is noted that the multi-layer coating 3 of FIGS. 2–4 is provided for purposes of example only, and this invention is not so limited. For example, this invention is also applicable to coatings having only one electroconductive layer, as well as to coatings including three or more conductive layers. For example in this regard, reference is made to FIGS. 1 and 5–6. FIG. 6 illustrates the FIG. 5 embodiment, as taken along Section Line 6—6 in FIG. 1.

In the FIGS. 5–6 embodiment, conductive (e.g., of or including Ag) layer 61 is located between dielectric layers 63 and 65. Conductive layer 61 may instead comprise gold, NiCr, indium-tin-oxide (ITO), or any other suitable conductive material in other embodiments of this invention. Each of dielectric layers 63, 65 includes at least one dielectric layer in different embodiments of this invention. For example, dielectric layers 63, 65 may be of or include silicon nitride, silicon oxide, zinc oxide, silicon oxynitride, tin oxide, zinc titanium dioxide, niobium oxide, SiZrN, and/or any other suitable dielectric in different embodiments of this invention.

In the FIGS. 5–6 embodiment, after the conductive bus bars 7, 9 have been deposited (e.g., via silk screen deposition or any other suitable deposition process) on substrate over coating 3 so as to rest upon the outer surface of dielectric layer 63, the bus bars and/or coating is/are heated (e.g., to a temperature of at least 400 degrees C, more preferably from about 500 to 700 degrees C) for a period of time (e.g., at least one minute, more preferably from about 3–15 minutes) so that bus bars 7 and 9 become molten or at least flowable semi-molten in form (i.e., the transition and/or flowable temperature of bus bars 7 and 9 is less than that of layers 29 and 39 in certain example embodiments). As discussed above, this heating causes at least portions of molten or semi-molten bus bars 7, 9 to bleed and/or migrate downward through at least dielectric layer(s) 63 of coating 3 until coming into contact with conductive layer(s) 61 as shown in FIGS. 5–6. The bleeding of the bus bars 7, 9 may or may not reach substrate 2 in different embodiments of this invention. After this heating/bleeding step and subsequent cooling and solidifying of the bus bars 7 and 9, the newly formed bus bars 7 and 9 are now both in electrical contact with conductive layer(s) 61 through respective contact holes 58 formed in the coating 3 (i.e., the contact holes 58 are formed in at least layer 63) as shown in FIGS. 5–6 while still retaining their presence at the upper surface of coating 3 so that they can be in electrical contact with connectors 8 (see discussion of connectors 8 above). Then, the coated substrate is laminated to another substrate 4 via PVB layer 5 as discussed above in the previous embodiment.

In certain example embodiments, vehicle windows of the FIGS. 1–6 embodiments of this invention may be characterized as follows in Table 5, though the invention is not so limited unless the same is recited in the claims.

TABLE 5

Color/Transmission After HT; Laminated Form

| Characteristic | General | More Preferred |
|---|---|---|
| $T_{vis}$(Ill. A, 2 deg.): | >=70% | >=75% |
| $T_{vis}$(Ill. C, 2 deg.): | >=70% | >=75% |
| $R_gY$ (Ill. A, C; 2 deg.): | <=11% | <=9% |
| $a^*_g$ (Ill. A, C; 2°): | −2.0 to +2.0 | −1.0 to +1.0 |
| $b^*_g$ (Ill. A, C; 2°): | −10.0 to +1.0 | −8.0 to −2.0 |
| $R_fY$ (Ill. A, C; 2 deg.): | <=11% | <=9% |
| $a^*_f$ (Ill. A, C; 2°): | −3.0 to +1.0 | −2.0 to 0.0 |
| $b^*_f$ (Ill. A, C; 2°): | −5.0 to 0.0 | −4.0 to −1.0 |
| $R_{solar}$: | >=26% | >=28% |
| Haze: | <=0.4 | <=0.3 |
| $T_{solar}$: | <=50% | <=48% |

It will be appreciated by those skilled in the art that the coating discussed above is for purposes of example only. Any other suitable coating may instead be used for coating 3, so long as such a coating includes at least one heatable conductive layer.

Once given the above disclosure many other features, modifications and improvements will become apparent to the skilled artisan. Such other features, modifications and improvements are therefore considered to be a part of this invention, the scope of which is to be determined by the following claims:

What is claimed is:

1. A heatable vehicle windshield including a top edge, a bottom edge, and first and second side edges, the heatable vehicle windshield comprising:

first and second glass substrates laminated to one another with a polymer inclusive interlayer therebetween;

a coating located between said first and second substrates, said coating including at least one conductive layer;

first and second conductive bus bars in electrical communication with at least said conductive layer of said coating, so that when electric current is passed through said conductive layer via said bus bars at least a portion of the windshield is heated;

wherein said first bus bar is located at a top area of said windshield and said second bus bar is located at a bottom area of said windshield;

a conductive extension member in electrical contact or communication with a central portion of said first bus bar proximate a top central area of the windshield, said conductive extension member including: a top elongated portion extending along or adjacent the top edge of the windshield; and a side elongated portion in electrical communication with said top elongated portion and extending along or adjacent the first side edge of the windshield and spaced apart from said coating; and wherein first and second electrical connectors in electrical communication with the first and second bus bars, respectively, are each attached to the windshield proximate the bottom edge thereof, at least one of said electrical connectors supplying electric current to said conductive layer of said coating via an external power source.

2. The heatable windshield of claim 1, wherein the first electrical connector is electrically connected to said first bus bar via said conductive extension member, and said second electrical connector is electrically connected to said second bus bar.

3. The heatable windshield of claim 2, wherein said top elongated portion of said conductive extension member is approximately parallel to and spaced upwardly from said first bus bar.

4. The heatable windshield of claim 3, wherein said conductive extension member further includes a bottom elongated portion extending along or adjacent the bottom edge of the windshield, said bottom elongated portion of said extension member being approximately parallel to said second bus bar and spaced outwardly from said coating so as to be electrically insulated from said conductive layer of said coating.

5. The heatable windshield of claim 4, wherein said top and bottom elongated portions of said extension member are in direct contact with said first substrate.

6. The heatable windshield of claim 5, wherein at least a portion of said coating is located between said bus bars and said first substrate, and said coating contacts said first substrate.

7. The heatable windshield of claim 5, wherein said polymer inclusive interlayer comprises PVB.

8. A heatable vehicle window comprising:

a coating supported by a first substrate, said coating including at least one conductive layer;

first and second conductive bus bars in electrical communication with at least said conductive layer of said coating, so that when electric current is passed through said conductive layer via said bus bars at least a portion of the window is heated;

wherein said first bus bar is at least partially located adjacent or along a first edge of the window, and said second bus bar is at least partially located adjacent or along a second edge of the window, said first and second edges of the window being opposite one another so that a primary viewing area of said window is positioned between said first and second bus bars;

a conductive extension in electrical contact or communication with a central portion of said first bus bar proximate the first edge of the window, said conductive extension extending along or adjacent said first edge of the window, and extending along a third edge of the window toward the second edge of the window so that first and second electrical connectors in electrical communication with the first and second bus bars, respectively, are each attached to the window proximate said second edge thereof; and wherein said first electrical connector is in electrical communication with said first bus bar via said conductive extension, and at least one of said electrical connectors supplies electric current to said conductive layer via an external power source.

9. The heatable window of claim 8, wherein said first edge is a top edge of the window, and said second edge is a bottom edge of the window.

10. The heatable window of claim 8, wherein said first substrate comprises glass, and said first substrate is laminated to a second glass substrate via at least a polymer inclusive interlayer.

11. The heatable window of claim 8, wherein said conductive extension is spaced from, and electrically insulated from, said coating along said second and third edges of the window.

12. The heatable window of claim 8, wherein said coating comprises said first and second conductive layers sandwiched between first and second dielectric layers, and wherein said bus bars are each in electrical contact with each of said first and second conductive layers of said coating.

13. The heatable window of claim 12, wherein said first and second dielectric layers comprise silicon nitride, and said first and second conductive layers comprise silver (Ag).

14. The heatable window of claim 8, wherein said coating has a sheet resistance $R_s$, less than or equal to 6 ohms/sq.

15. The heatable window of claim 8, wherein the window comprises a vehicle windshield.

16. A heatable vehicle window including first, second, third and fourth edges, wherein the first and second edges are opposite one another, and said third and fourth edges each extend between said first and second edges, the heatable vehicle window comprising:

a coating supported by a first substrate, said coating including at least one conductive layer;

first and second conductive bus bars in electrical communication with at least said conductive layer of said coating, so that when electric current is passed through said conductive layer via said bus bars at least a portion of the window is heated;

said first and second bus bars being located relative to one another so that a primary viewing area of said window is positioned between said first and second bus bars;

a conductive extension in electrical contact or communication with a central portion of said first bus bar, said conductive extension extending along or adjacent the first edge of the window, and extending along the third edge of the window toward the second edge of the window so that first and second electrical connectors in electrical communication with the first and second bus bars, respectively, are each attached to the window proximate said second edge thereof; and wherein said first electrical connector is in electrical communication with said first bus bar via said conductive extension, and at least one of said electrical connectors supplies electric current to said conductive layer via an external power source.

17. The heatable window of claim 16, wherein said first edge is a top edge of the window, said second edge is a bottom edge of the window, and said third edge is a side edge of the window extending between said first and second edges.

* * * * *